United States Patent
Burnim (10) Patent No.: US 7,949,714 B1
(45) Date of Patent: May 24, 2011

(54) SYSTEM AND METHOD FOR TARGETING ADVERTISEMENTS OR OTHER INFORMATION USING USER GEOGRAPHICAL INFORMATION

(75) Inventor: Jacob Samuels Burnim, Pasadena, CA (US)

(73) Assignee: Google Inc., Mountain View, CA (US)

( * ) Notice: Subject to any disclaimer, the term of this patent is extended or adjusted under 35 U.S.C. 154(b) by 981 days.

(21) Appl. No.: 11/295,292

(22) Filed: Dec. 5, 2005

(51) Int. Cl.
*G06F 15/16* (2006.01)

(52) U.S. Cl. ........ 709/206; 709/203; 709/205; 709/207; 709/219

(58) Field of Classification Search .................. 709/206, 709/207, 203, 205, 219
See application file for complete search history.

(56) References Cited

U.S. PATENT DOCUMENTS

| | | | |
|---|---|---|---|
| 3,566,153 A | 2/1971 | Spencer, Jr. ............. 307/205 |
| 5,208,748 A | 5/1993 | Flores et al. ............. 704/1 |
| 5,216,603 A | 6/1993 | Flores et al. ............. 704/1 |
| 5,613,108 A | 3/1997 | Morikawa ............... 393/616 |
| 5,724,521 A | 3/1998 | Dedrick ................. 395/226 |
| 5,734,837 A | 3/1998 | Flores et al. ............. 705/7 |
| 5,740,549 A | 4/1998 | Reilly et al. ............. 705/14 |
| 5,848,397 A | 12/1998 | Marsh et al. ............. 705/14 |
| 5,887,133 A * | 3/1999 | Brown et al. ............. 709/200 |
| 5,918,014 A | 6/1999 | Robinson ............. 395/200.49 |
| 5,948,058 A | 9/1999 | Kudoh et al. ............. 709/206 |
| 5,948,061 A | 9/1999 | Merriman et al. ............. 709/219 |
| 5,987,454 A | 11/1999 | Hobbs ............... 707/4 |
| 6,014,502 A | 1/2000 | Moraes ............... 395/200.49 |
| 6,026,368 A | 2/2000 | Brown et al. ............. 705/14 |
| 6,044,376 A | 3/2000 | Kurtzman, II ............. 707/102 |
| 6,078,914 A | 6/2000 | Redfern ............... 707/3 |
| 6,115,709 A | 9/2000 | Gilmour et al. ............. 707/9 |
| 6,134,532 A | 10/2000 | Lazarus et al. ............. 705/14 |

(Continued)

FOREIGN PATENT DOCUMENTS

WO  WO 97/21183  6/1997

(Continued)

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

(Continued)

*Primary Examiner* — Michael Won
(74) *Attorney, Agent, or Firm* — Morgan, Lewis & Bockius LLP (57) ABSTRACT

A request for information items may include content information associated with one or more electronic messages and geographical information associated with the requesting user. A set of information items is identified based on the user geographical information and the message content of the one or more electronic messages. In some embodiments, at least one of the information items is identified based on both on the user geographical information and the message content. In some embodiments, if the user geographical information is different from the user's default geographical information, at least one of the information items is identified based on the user geographical information, but not the message content. A subset of the identified information items may be selected in accordance with a scoring or ranking function. The selected information items are transferred to the requesting client and displayed concurrently with (e.g., next to) the electronic messages.

21 Claims, 5 Drawing Sheets

U.S. PATENT DOCUMENTS

| | | | |
|---|---|---|---|
| 6,144,944 A | 11/2000 | Kurtzman, II et al. | 705/14 |
| 6,148,332 A * | 11/2000 | Brewer et al. | 709/218 |
| 6,167,382 A | 12/2000 | Sparks et al. | 705/26 |
| 6,185,551 B1 | 2/2001 | Birrell et al. | 707/3 |
| 6,269,361 B1 | 7/2001 | Davis et al. | 707/3 |
| 6,332,127 B1 | 12/2001 | Bandera et al. | 705/14 |
| 6,356,834 B2 * | 3/2002 | Hancock et al. | 701/200 |
| 6,381,465 B1 | 4/2002 | Chern et al. | 455/466 |
| 6,401,075 B1 | 6/2002 | Mason et al. | 705/14 |
| 6,449,657 B2 * | 9/2002 | Stanbach et al. | 709/245 |
| 6,505,046 B1 | 1/2003 | Baker | 455/456 |
| 6,522,875 B1 | 2/2003 | Dowling et al. | 455/414 |
| 6,571,279 B1 * | 5/2003 | Herz et al. | 709/217 |
| 6,587,835 B1 | 7/2003 | Treyz et al. | 705/14 |
| 6,606,644 B1 | 8/2003 | Ford et al. | 709/203 |
| 6,654,735 B1 | 11/2003 | Eichstaedt et al. | 707/3 |
| 6,732,152 B2 * | 5/2004 | Lockhart et al. | 709/206 |
| 6,757,740 B1 | 6/2004 | Parekh et al. | 709/245 |
| 6,788,769 B1 * | 9/2004 | Waites | 379/93.24 |
| 6,847,969 B1 * | 1/2005 | Mathai et al. | 707/100 |
| 6,847,992 B1 | 1/2005 | Haitsuka et al. | 709/218 |
| 6,947,396 B1 * | 9/2005 | Salmi | 370/310 |
| 6,983,139 B2 * | 1/2006 | Dowling et al. | 455/414.2 |
| 6,983,311 B1 * | 1/2006 | Haitsuka et al. | 709/217 |
| 6,985,882 B1 | 1/2006 | DelSesto | 705/37 |
| 6,993,553 B2 | 1/2006 | Kaneko et al. | 709/201 |
| 7,039,599 B2 * | 5/2006 | Merriman et al. | 705/14.52 |
| 7,062,572 B1 | 6/2006 | Hampton | 709/245 |
| 7,136,875 B2 | 11/2006 | Anderson et al. | 707/104.1 |
| 7,136,915 B2 * | 11/2006 | Rieger, III | 709/223 |
| 7,188,356 B1 | 3/2007 | Miura et al. | 725/46 |
| 7,203,727 B2 * | 4/2007 | Suzuki et al. | 709/206 |
| 7,243,080 B2 | 7/2007 | Bhadra | 705/28 |
| 7,376,714 B1 | 5/2008 | Berken | 709/219 |
| 7,487,112 B2 * | 2/2009 | Barnes, Jr. | 705/26 |
| 7,584,251 B2 * | 9/2009 | Brown et al. | 709/206 |
| 7,668,832 B2 | 2/2010 | Yeh et al. | 707/10 |
| 2001/0054066 A1 * | 12/2001 | Spitzer | 709/203 |
| 2002/0010794 A1 | 1/2002 | Stanbach, Jr. et al. | 709/245 |
| 2002/0032771 A1 * | 3/2002 | Gledje | 709/224 |
| 2002/0046099 A1 | 4/2002 | Frengut et al. | 705/14 |
| 2002/0052925 A1 | 5/2002 | Kim et al. | 709/217 |
| 2002/0078158 A1 * | 6/2002 | Brown et al. | 709/206 |
| 2002/0087631 A1 | 7/2002 | Sharma | 709/203 |
| 2002/0094868 A1 | 7/2002 | Tuck et al. | 463/42 |
| 2002/0107735 A1 | 8/2002 | Henkin et al. | 705/14 |
| 2002/0116494 A1 | 8/2002 | Kocol | 709/224 |
| 2002/0165923 A1 * | 11/2002 | Prince | 709/206 |
| 2002/0188689 A1 * | 12/2002 | Michael | 709/206 |
| 2002/0188699 A1 * | 12/2002 | Ullman et al. | 709/219 |
| 2003/0037140 A1 | 2/2003 | Aaltonen | 709/225 |
| 2003/0050916 A1 | 3/2003 | Ortega et al. | 707/1 |
| 2003/0069029 A1 * | 4/2003 | Dowling et al. | 455/456 |
| 2003/0088554 A1 | 5/2003 | Ryan et al. | 707/3 |
| 2003/0191689 A1 | 10/2003 | Bosarge et al. | 705/14 |
| 2003/0233419 A1 | 12/2003 | Beringer | 709/206 |
| 2004/0059712 A1 | 3/2004 | Dean et al. | 707/1 |
| 2004/0068435 A1 | 4/2004 | Braunzell | 705/14 |
| 2004/0083133 A1 | 4/2004 | Nicholas et al. | 705/14 |
| 2004/0181580 A1 | 9/2004 | Baranshamaje | 709/206 |
| 2004/0199623 A1 | 10/2004 | Houri | 709/223 |
| 2005/0015394 A1 | 1/2005 | McKeeth | 707/100 |
| 2005/0033657 A1 | 2/2005 | Herrington et al. | 705/26 |
| 2005/0038861 A1 | 2/2005 | Lynn et al. | 709/206 |
| 2005/0060310 A1 | 3/2005 | Tong et al. | 707/7 |
| 2005/0076051 A1 | 4/2005 | Carobus et al. | 707/102 |
| 2005/0076132 A1 | 4/2005 | Roberts et al. | 709/228 |
| 2005/0131715 A1 | 6/2005 | Trethewey | 705/1 |
| 2005/0131884 A1 | 6/2005 | Gross et al. | 707/3 |
| 2005/0137939 A1 | 6/2005 | Calabria et al. | 705/26 |
| 2005/0149397 A1 | 7/2005 | Morgenstern et al. | 705/14 |
| 2005/0165896 A1 * | 7/2005 | Mooney | 709/206 |
| 2005/0177401 A1 | 8/2005 | Koeppel et al. | 705/4 |
| 2005/0187823 A1 | 8/2005 | Howes | 705/14 |
| 2005/0216454 A1 | 9/2005 | Diab et al. | 707/3 |
| 2005/0222900 A1 | 10/2005 | Fuloria et al. | 705/14 |
| 2006/0020510 A1 | 1/2006 | Vest | 705/14 |
| 2006/0026046 A1 | 2/2006 | Yaron et al. | 705/7 |
| 2006/0075445 A1 | 4/2006 | O'Kane | 725/100 |
| 2006/0080303 A1 | 4/2006 | Sargent et al. | 707/3 |
| 2006/0085434 A1 | 4/2006 | Mah et al. | 707/100 |
| 2006/0167747 A1 | 7/2006 | Goodman et al. | 705/14 |
| 2006/0179127 A1 * | 8/2006 | Randall | 709/219 |
| 2006/0184617 A1 * | 8/2006 | Nicholas et al. | 709/203 |
| 2006/0294084 A1 | 12/2006 | Patel et al. | 707/3 |
| 2007/0033531 A1 | 2/2007 | Marsh | 715/738 |
| 2007/0050372 A1 | 3/2007 | Boyle | 707/10 |
| 2007/0294740 A1 | 12/2007 | Drake et al. | 725/131 |

FOREIGN PATENT DOCUMENTS

| | | |
|---|---|---|
| WO | WO 00/23931 | 4/2000 |
| WO | WO 0054201 | 9/2000 |

OTHER PUBLICATIONS

Bellotti, V. et al., "Taskmaster: recasting email as task management," PARC, CSCW '02 Workshop on Redesigning Email for the 21st Century.

Comer, D. and Peterson, L., "Conversation-Based Mail," ACM Transactions on Computer Systems (TOCS) vol. 4, Issue 4, pp. 299-319, Nov. 1986.

Flores, F. et al., "Computer Systems and the design of organizational interaction," ACM Transactions on Information Systems., pp. 153-172, (1988).

Shepherd, A. et al., "Strudel-an extensible electronic conversation toolkit," Proceedings of the 1990 ACM Conference on Computer-supported Cooperative Work, Los Angeles, California, United States, pp. 93-104.

Venolia, G., et al., "Supporting Email Workflow, "Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is,"pp. 256A-260, Byte, Dec. 1988.

Zawinski, J., "Message Threading," http://www.jwz.org/doc/threading.html, pp. 1-9 (1997-2000).

Digital Envoy Press Release, "DoubleClick and Digital Envoy Partner to Offer Advanced Geo-Targeting Solutions," http://digitalenvoy.net/news/press-release/2004/pr_322 . . . , Mar. 23, 2003.

Adforce, Inc., "User Guide—A Complete Guide to AdForce," Ver. 2.6, 1998, pp. 285.

NetGravity AdServer AdMaster's Guide, Mar. 11, 1997, 59 pages.

U.S. Appl. No. 95/001,073, filed Jul. 30, 2008, Reexamination of Stone et al.

U.S. Appl. No. 95/001,061, filed Jul. 7, 2008, Reexamination of Stone et al.

U.S. Appl. No. 95/001,069, filed Jul. 21, 2008, Reexamination of Dean et al.

AdForce, Inc., S-1/A Sec Filing, May 6, 1999, 9 pages.

AdKnowledge Campaign Manager: Reviewer's Guide, AdKnowledge, Aug. 1998, 23 pages.

AdKnowledge Market Match Planner: Reviewer's Guide, AdKnowledge, May 1998, 26 pages.

Ad-Star.com website archive from www.Archive.org, Apr. 12, 1997 and Feb 1, 1997, 43 pages.

Baseview Products, Inc., AdManagerPro Administration Manual v. 2.0, Dec. 1998, 226 pages.

Baseview Products, Inc., ClassManagerPro Administration Manual v. 1.0.5, Feb. 1, 1997, 157 pages.

Business Wire, "Global Network, Inc. Enters Into Agreement in Principle With Major Advertising Agency," Oct. 4, 1999, 2 pages.

Dedrick, R., Interactive Electronic Advertising, IEEE, 1994, 12 pages.

Dedrick, R., A Consumption Model for Targeted Electronic Advertising, Intel Architecture Labs, IEEE, 1995, 9 pages.

Friedman, N., "Dashboard," Jul. 25, 2003, 24 pages.

Information Access Technologies, Inc., Aaddzz brochure, "The Best Way To Buy And Sell Web Advertising Space," © 1997, 6 pages.

Information Access Technologies, Inc., Aaddzz.com website archive from www.Archive.org, archived on Jan. 30, 1998, 42 pages.

Zeff, R. et al., *Advertising on the Internet*, 2nd Ed., John Wiley & Sons, 1999, 130 pages.

Request for Reexamination of U.S. Patent No. 7,240,025 B2, U.S. Appl. No. 95/001,073, 85 pages.

U.S. Appl. No. 95/001,068, Reexamination of Stone et al.

Request for Reexamination of U.S. Patent No. 6,446,045 B1, U.S. Appl. No. 95/001,061, 54 pages.

Request for Reexamination of U.S. Patent No. 7,249,059 B2, U.S. Appl. No. 95/001,069, 81 pages.

Request for Reexamination of U.S. Patent No. 6,829,587 B2, U.S. Appl. No. 95/001,068, 85 pages.

* cited by examiner

SYSTEM AND METHOD FOR TARGETING ADVERTISEMENTS OR OTHER INFORMATION USING USER GEOGRAPHICAL INFORMATION

RELATED APPLICATIONS

This application is related to U.S. patent application Ser. No. 10/914,035, filed Aug. 6, 2004, entitled "Displaying Conversations in a Conversation-Based Email System," which is incorporated by reference herein in its entirety. This application is also related to U.S. patent application Ser. No. 11/111,166, filed Apr. 20, 2005, entitled "System and Method for Targeting Information Based on Message Content," which is incorporated by reference herein in its entirety.

TECHNICAL FIELD

The disclosed embodiments relate generally to providing information to computer users, and in particular, to provide information to a computer user based on the user's geographical information.

BACKGROUND

Online content-targeted advertising typically provides advertisements that are related to the content of an electronic document that a user is viewing, such as a web page or an email message. The process of selecting content-targeted advertisements is typically independent from the geographical location where the user accesses the web page or email message. For example, a user in San Francisco viewing an email message is served with the same set of advertisements as another user in New York City viewing the same message. In the present invention, however, a user's geographical information is incorporated into the process of selecting advertisements to be presented to the user.

SUMMARY

A request for information items may include content information associated with one or more electronic messages and geographical information associated with the requesting user. The user geographical information may be derived from an IP address of a requesting client. A set of information items is identified based on the user geographical information and the message content of the one or more electronic messages. In some embodiments, at least one of the information items is identified based on both the user geographical information and the message content. In some embodiments, if the user geographical information is different from the user's default geographical information, at least one of the information items is identified based on the user geographical information, but not the message content. A subset of the identified information items may be selected in accordance with a scoring or ranking function. The selected information items are transferred to the requesting client and displayed concurrently with (e.g., next to) the requested message.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

DESCRIPTION OF EMBODIMENTS

Figure 1:
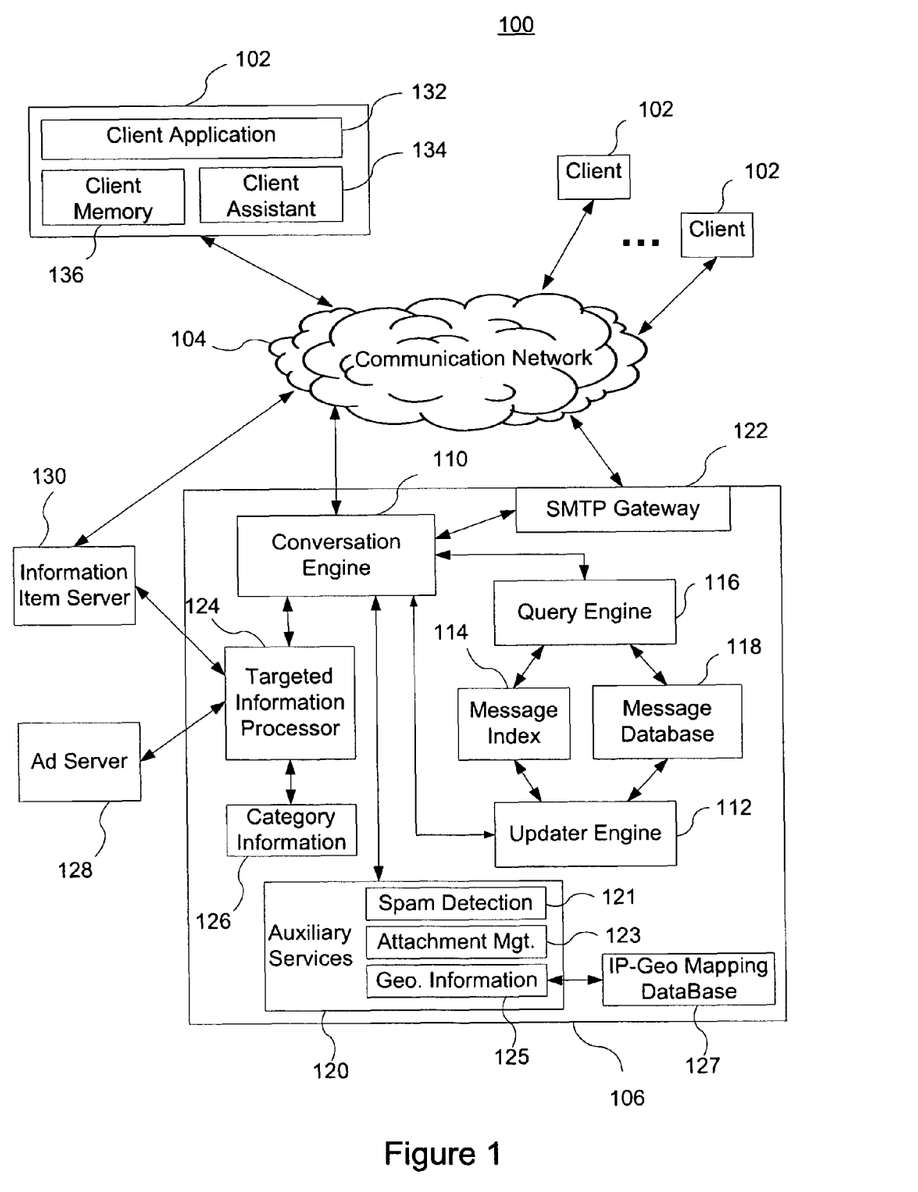
FIG. 1 is a block diagram of an exemplary environment that generates geo-targeted, content-targeted information based on message content requested by a client in accordance with some embodiments of the present invention.

FIG. 1 is a block diagram of a system 100 for implementing some embodiments of the invention. One or more clients 102 can be connected to a communication network 104. The communication network 104 can be connected to an information service 106. The information service 106 can include a conversation engine 110, an updater engine 112, a message index 114, a query engine 116, a message database 118, one or more auxiliary services servers 120, an SMTP gateway 122, a targeted information processor 124, and category information 126. The targeted information processor 124 can be connected to an advertisement server 128 and/or one or more information item servers 130.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to monitoring a user's activities with respect to the client application 132 and/or other applications, searching or browsing for resources (e.g., files) on the client 102, and processing information received from or being sent to information service 106. The client assistant 134 can be part of the client application 132, available as a plug-in to the client application 132 (provided, for example, from various on-line sources), or provided as a stand-alone program. The client assistant can be a web-based messaging application such as the client executable portion of the Google Gmail product. A client memory 136 can store system information and information about a user, among other things.

The communication network 104 can be any local area network (LAN) and/or wide area network (WAN), such as an intranet, an extranet, or the Internet. It is sufficient that the communication network 104 provides communication capability between the clients 102 and the information service 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

The conversation engine 110 can respond to a variety of requests from the client assistant 134 related to messages and return conversation-based responses via its connection with the communication network 104. A conversation may include one or more relevant messages relating to a conversation topic. Various criteria can be used to determine which messages are part of each distinct conversation. For example, an analysis can be made of the contents of messages received and/or sent by a user. Messages whose contents are found to be related can be grouped together. In another example, a thread identifier found in a message header can also be used to identify related messages. In a further example, a subject line in the message header can be used to identify related messages. The senders and recipients of the messages are participants in the conversation. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

The information service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation is a displayed portion of the list, the snippet including a portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the information service 106 and other email systems, messaging systems or information services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services servers 120 can provide additional services to the conversation engine 110. In some embodiments, the auxiliary services servers 120 include a spam detection module 121 for detecting and processing spam, an attachment management module 123 for managing the storage and retrieval of documents attached to messages, and a geographical information module 125 for extracting user geographical information from a login or message access request.

For example, when the information service 106 receives a login request initiated by a user from a client 102, it extracts an IP address of the client from the login request. The IP address is typically a 32-bit digital number that uniquely identifies the client on the Internet. The information service 106 includes an IP-Geo mapping database 127. The IP-Geo mapping database 127 includes many entries, each entry mapping one or more IP addresses to a specific geographical location. For example, the entry "171.64.*.*→Stanford, Calif. 94305" indicates that any IP address whose first eight bits correspond to the decimal value "171" and second eight bits correspond to the decimal value "64" refers to a computer located at Stanford, Calif. 94305. The geographical information module 125 is responsible for converting the IP address of the client into the client user's geographical location. This geographical location is used subsequently by the advertisement server 128 and the information item server 130 for selecting one or more information items relevant to the user's geographical location. In some other embodiments, the service provided by the geographical information module 125 and the IP-Geo mapping database 127 may be delegated to a geographical information server that is connected to the information service 106. Upon receiving a login or message access request, the information service 106 forwards the IP address included in the request to the geographical information server. The geographical information server returns to the information service 106 the geographical location corresponding to the IP address.

As mentioned above, the conversation engine 110 can be connected to the targeted information processor 124. The targeted information processor 124 can provide geo-targeted and/or content-targeted information for display to a user at client 102. The targeted information processor 124 can provide, for example, advertisements and/or other information items related to the user's messages being handled by the conversation engine 110. In some embodiments, the messages include not only messages received by the user but also messages authored and sent by the user. In some other embodiments, the advertisements may be only related to a user's geographical location, not to the message content at all. This scenario may be appropriate in some special circumstances, e.g., when the user is on a business trip and away from the location where the user usually logs into his or her account. Advertisements are herein defined to include information items, or links to information items, that offer or promote products, services, events, companies, organizations, ideas or the like.

The targeted information processor 124 can be connected to category information 126 which is used by the targeted information processor 124 to identify various categories based on the user's current geographical information and the contents of the message(s) being sought. The category information can be used to obtain, for example, category-related advertisements and/or other supplemental information. Category-related advertisements can be obtained, for example, from advertisement server 128. Other category-related information can be obtained, for example, from information item server 130.

FIG. 1 is exemplary. In some embodiments, the information service 106 contains a subset or superset of those elements illustrated in the figure. Although FIG. 1 shows the information service 106 as a number of discrete elements, this figure is intended more as a functional description of the various features which may be present in the information service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in information service 106 and how features are allocated among the servers will vary from one implementation to another, and may depend in part on the amount of traffic that the system must handle during peak usage periods as well as during average usage periods. For example, the message database 118 can be implemented using a plurality of servers if the information service 106 manages a large volume of messages associated with a large number of user accounts.

As mentioned above, the client 102 can include client application 132 and client assistant 134. Client application 132 can provide a window to be displayed on a displaying device (e.g., a monitor) for rendering conversations and targeted information associated with a particular user. The conversations, targeted information and messages in the conversations can be encoded using HyperText Markup Language (HTML), XML, or any other appropriate markup language or encoding scheme, and then rendered by the client application 132. When a user submits a request through client application 132 to the information service 106 to access messages stored in the user's account, the information service 106 identifies conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the information service 106.

The information service 106 and client assistant 134 work in concert to allow a user to view, compose, send and/or search messages in the user's message account and to present the search results in a highly intuitive fashion. The information service 106 extracts information from a user's message account by processing messages received, sent and/or being composed by the user, and the client assistant 134 assists in rendering the information prepared by the information service 106. In other embodiments a different division of duties between the information service 106 and the client assistant 134 can be implemented. Because many of the tasks performed by the system can be performed by either the information service 106 or the client assistant 134 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some embodiments, when a conversation is being displayed in the conversation view, additional, targeted information (sometimes herein called "informational items") can be displayed in the display window. For example, one or more advertisements relevant to, or related to, one or more of the messages in the conversation can be displayed. In another example, one or more other types of information can be displayed. Such other information can include, but is not limited to news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

RSS feeds can be content distributed from various sources on a network (e.g., the Internet). RDF Site Summary (RSS) (and sometimes, Real Simple Syndication) is an XML-based lightweight multi-purpose extensible metadata description and syndication format. RSS is typically used for distributing various types of content to a number of receivers simultaneously. News items can be news items from one or more sources. Blog events can be events generated from one or more web logs (blogs). User polls can be polls that the user may participate in which may come from a variety of sources. Stock prices can be stock prices of companies whose names or stock ticker symbols are mentioned in the conversation. Weather forecasts can be weather forecasts of locations whose names are directly or indirectly referred to by a message in the conversation, or that correspond to the current location of the requesting user.

Figure 2:
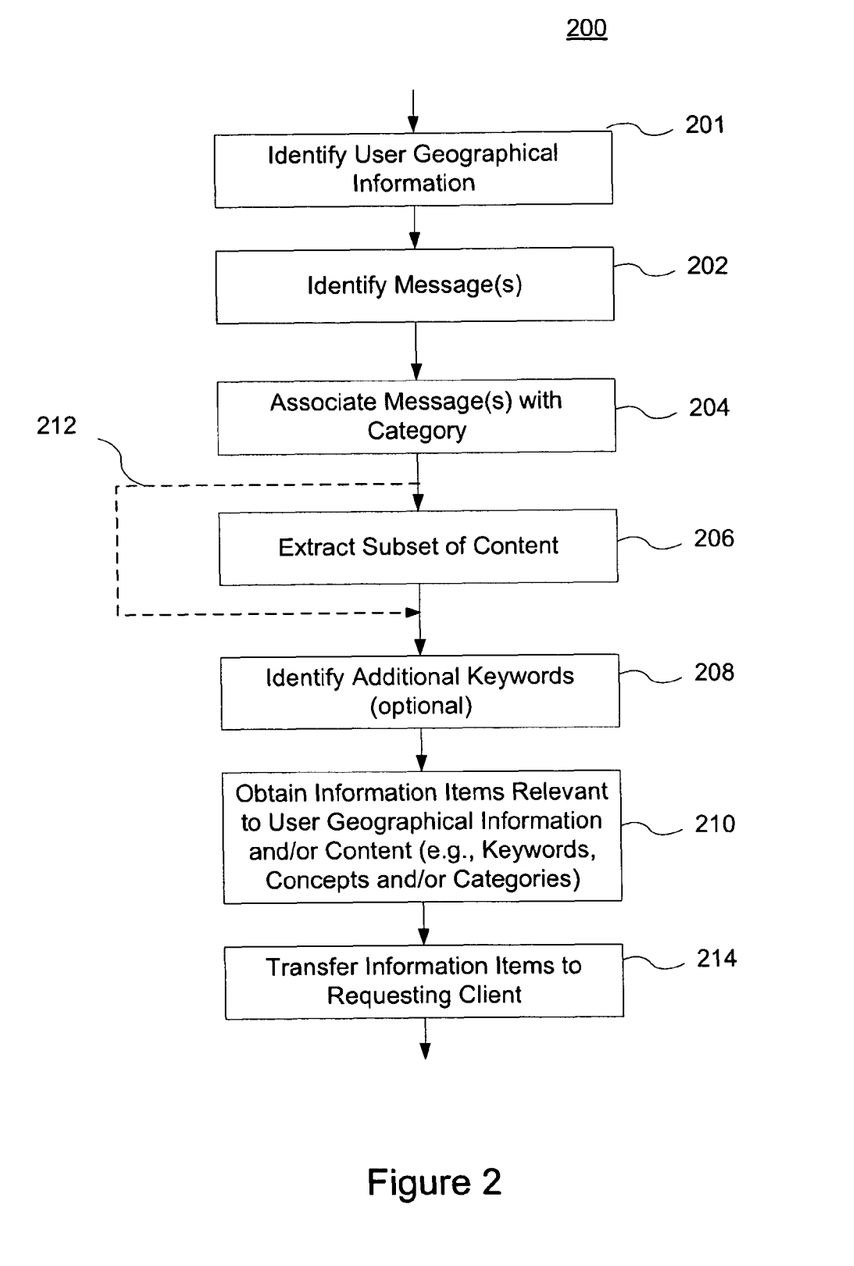
FIG. 2 is a flow diagram of a process for generating geo-targeted, content-targeted information in response to a message access request in accordance with some embodiments of the present invention.

FIG. 2 illustrates a process of generating targeted information items in response to a message access request in accordance with some embodiments of the present invention. Initially, the user's geographical information is identified (201). The user's geographical information may be generated and stored in the information service 106 when the user logs into his or her account at the information service 106. In some embodiments, the information service 106 extracts from the message access request the IP address of the requesting client and identifies the user's geographical information using the IP address. Next, a conversation including the requested message(s) is identified (202). For example, the requested message(s) may include an identifier of a conversation associated with the message. As mentioned above, a conversation can include one or more related messages. The identification at 202 can identify all of the messages in a conversation or selected messages in a conversation. Various selection criteria can be used when identifying selected messages in a conversation. For example, messages can be identified based on whether they were authored and sent by the user. Alternatively, messages can be identified based on whether a message was authored by the user within a predefined time period (e.g., the messages authored within the last 24 hours are identified). In another example, a conversation may be associated with a pool of messages of different types received or sent by the user, such as email messages, IM messages, transcribed voice messages, SMS messages and search query results. In this event, messages can be identified based on whether a message is of a particular type or a combination of two or more of the criteria mentioned above. For illustrative purposes, the following discussion assumes that the process of FIG. 2 is triggered by a user's act of clicking a conversation link in a conversation list view and is applied to one or more messages identified as members of the same conversation. One skilled in the art will appreciate that the process of FIG. 2 could be triggered by other types of events as well.

The identified messages can then be associated with one or more categories (204). Some examples of categories include, but are not limited to, online shopping, package shipping, travel, weather forecast, stock market, entertainment, dining, online auctions, health/beauty, taxes, real estate, computer software and hardware, and mortgages. More generally, the categories associated with the identified messages can include categories of things, activities, processes, events, concepts and the like. In some instances the messages may have no associated category.

In some embodiments, each category may be associated with a list of content elements. When the percentage of identified content elements associated with a particular category within a message or set of messages reaches a predetermined threshold, the messages are deemed relevant to that particular category. Certain metrics can be used to distinguish a most relevant category when more than one category has associated content elements present in a message or set of messages. The most relevant category associated with a message can be determined in a number of ways. For example, a category having the most number of unique content elements present in the message can be identified as the most relevant category. As another example, a category that has the highest ratio of the number of content elements which belong to that category as compared to the total number of identified content elements in the message can be identified as the most relevant category.

After determining that the messages are associated with one or more categories, a subset of the content of the messages can then be extracted (206). The content of the messages from which a subset can be extracted can include one or more of the following: a conversation description (e.g., a subject line of the message), one or more message bodies, a message sender domain, a message sender, a conversation label, one or more message labels, one or more message recipients, other message information, or information related to a conversation containing the messages. What is extracted from the messages into the subset can be dependent on the categories associated with the messages. The extracted subset can aid in obtaining the most relevant information from third party information servers by, for example, excluding from the subset content elements which may cause information not relevant to the pertinent portions of message to be returned from an information service (e.g., an advertisement service). Generally speaking, a content element is one or more terms, such as a word or phrase. For example, a content element filter list for a category of "online shopping" can include the content element "receipt" and/or "your order has shipped". A content subset can be created by filtering those content elements in the list from the message. Other content elements can also be filtered which may not be directly related to a specific category, but nonetheless may be likely to result in an information service returning information not directly relevant to the conversation. For example, message header information and selected message component identifiers (e.g., "To:") can be filtered from the identified messages, regardless of the identified category.

In some embodiments, one or more additional keywords can be identified (208) based on the associated categories and the content subset, and those additional keywords can be added to the content subset prior to the content subset being used to obtain relevant information. These additional keywords can increase a desired relevancy of the information returned from an information service. For example, after a "stock market" category is identified at 204 (e.g., because the requested message includes a public company's stock ticker symbol or company name), it can be useful to identify related keywords, such as "news" and "products", which are combined with the extracted content and sent to an information service. In other words, the additional keywords can be content elements that are related to a category, even if they are not present in the message or messages being processed. Sometimes keywords may be identified based on the user's geographical information. For example, keywords like "ski resort", "ski equipment" and "weather forecast" may be selected if the user's geographical information includes Aspen, Colo., although the message does not have skiing-related content.

The content elements in the content subset can be used to determine which additional keywords are added to the content subset. For example, finding an international flight number in a message may cause the additional keywords "flight schedule", "currency exchange," and other related keywords as well, to be added to the content subset sent to the information service, whereas finding a domestic flight number in the message would not cause the additional keyword "currency exchange" to be added to the content subset. As another example, if the destination of a flight can be determined (e.g., by identifying or decoding a city, airport or other location code), the name of the destination and the keyword "weather forecast" can be added to the content subset.

Information relevant to the extracted content is then obtained (210) from one or more information servers (e.g., advertisement server 128 and/or information item server 130 providing services like stock quotes, maps, weather forecasts, etc.). The input provided to the information services can include one or more additional keywords identified at 208. In some embodiments (as represented by the dashed line at 212 in FIG. 2), additional keywords can be used in place of content extracted from the identified messages. The information obtained from the information servers may include items that are specifically relevant to the identified message(s) or the user geographical information or a combination thereof and may include web pages, links to web pages, content extracted from web pages, content extracted from one or more databases or other information sources, links for extracting such information from one or more databases or other information sources, and so on.

The information items obtained from the information servers can be transferred to a requesting client (214) and prepared for display to a user who sent the message access request that triggered the aforementioned process from a particular client 102. The information service 106 can provide formatting information directing the display of the information items obtained from the information servers. The obtained information is preferably displayed in a manner consistent with the user's expectation. For example, if the obtained information is associated with a conversation or a message in the conversation requested by the user, it is simultaneously displayed next to the requested conversation or message in a corresponding conversation view. If the obtained information is associated with a message just sent by the user and the user expects to return to the conversation list view, the information items may be displayed at the top of the conversation list view in order to attract the user's attention.

It will be understood by one skilled in the art that the aforementioned schemes of rendering the obtained information items in a display device are exemplary. Other rendering schemes may be used in other embodiments. Typically, the information items are displayed at a location within an application or browser window that is prominent, but consistent with the normal experience that users have with a particular information service.

Figure 7:
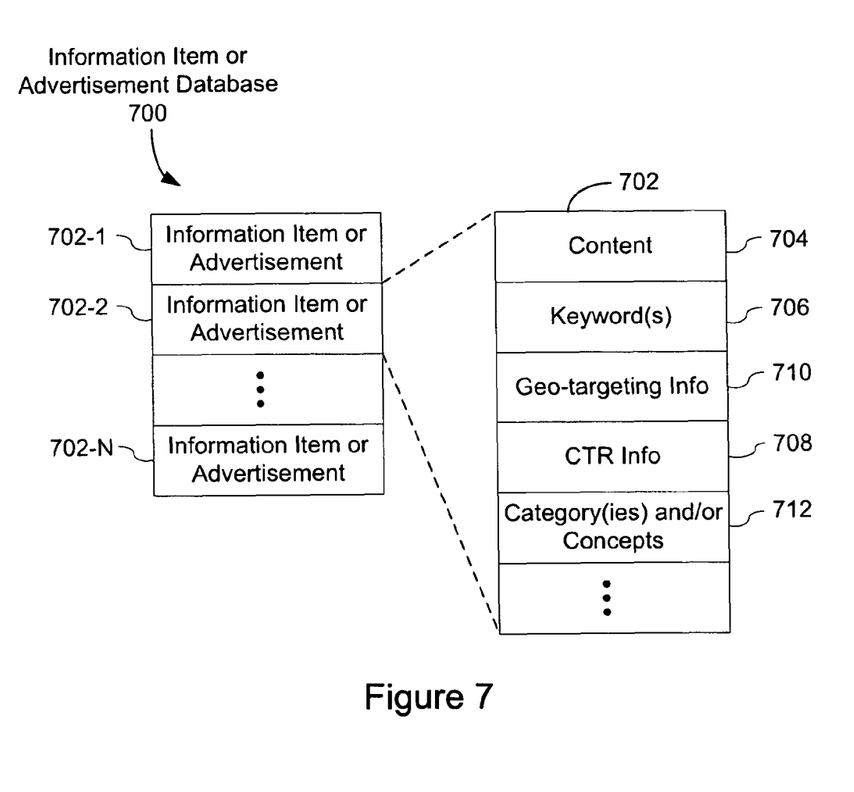
FIG. 7 is a block diagram of a database for advertisements or other information items.

FIG. 7 is a conceptual block diagram of a database 700 for storing advertisements, or other information items, and associated information. In various embodiments, the information in the database may be stored in multiple data structures, or even multiple computers, and need not be organized in the specific manner shown in FIG. 7. For instance, the database 700, may be stored and/or accessed by the information item server 130 and/or the advertisement server 128 of FIG. 1.

The database 700 includes a set of information items 702, which may include advertisements and/or other types of information items. For ease of explanation, both advertisements and other information items are herein called information items. Each information item 702 includes content 704, and keywords 706 associated with the information item and/or identifiers 712 of categories and/or concepts associated with the information item. The information items may optionally include click-through information 708. Optionally, a subset of the information items include geo-targeting information 710. Optionally, other fields or types of information may also be stored with or associated with one or more of the information items. Content 704 may include text, graphics, links to URLs or other content storage locations. The content 704 of one or more of the items 702 may optionally be preformatted for display, for example by including HTML tags. Keywords 706 are one or more keywords used to identify or select information items. Keywords for advertisements, and perhaps other types of information items as well, may be associated with bids. Bids are used in an auction or similar process for determining advertisement or information item selection and placement. Alternately, or in addition, bids may be used to determine debits or credits to be applied to one or more financial accounts when predefined events occur with respect to the associated advertisements or information items.

Category and/or concept identifiers 712 identify concepts or categories associated with an information item. The categories and/or concepts may be identified by running a classifier or other analysis tool on the content of the information item, or on content associated with the information item (e.g., when the information item contains a link to a URL, the content of the URL may be analyzed to associated categories and/or concepts with the information item).

Geo-targeting information 710, when provided for an information item or advertisement, may be used to limit the users who receive the information item or advertisement to users whose current location is consistent with the geo-targeting information 710 for that information item or advertisement. Geo-targeting information 710 for particular information items may specify geographic regions of different sizes, including large regions (e.g., Canada, or New York State), small regions (e.g., locations within 1000 yards of a particular address in New York City), and regions of any intermediate size, such as a county (e.g., Santa Clara County, California), a metropolitan area (e.g., "the Bay area of Northern California"), a city (e.g., Palo Alto, Calif.), or any other well defined geographic region that is suitable for use in geo-targeting. As explained elsewhere in this document, a user's current location may be determined by the current IP address of user, or may be determined using other positioning mechanisms (e.g., if the client 102 is a cell phone, the cell phone network for the client 102 may provide information about the user's current location). In some embodiments, information items or advertisements that do not have geo-targeting information associated with them are assumed to be targeted to all users.

Click-through rate (CTR) information 708 for an information item includes one more CTR values. The click-through rate (CTR) of an information item is defined as the number of times that users clicked on links to the information item divided by the number of times that links to the information item were displayed to different users during a predefined time period. A shorthand version of this definition is "number of click-throughs divided by number of impressions," where each "impression" is the display or presentation of the information item to a user. An information item having a high click-through rate (CTR) is more likely to be clicked than one having a low click-through rate provided that other conditions of the two information items are relatively equal. In other words, the actual click-through rate of an information item is treated as a proxy for its predicted click-through rate for the purpose of determining its relevancy to a user. In the simplest implementations, the CTR information 708 for an information item is a single value representing the click-through rate for the information items for a predefined period of time. In other implementations, separate CTR values may be provide for a plurality of time periods (e.g., the last month, the last week, etc.), and/or for a plurality of geographic regions, and/or for a plurality of categories of users, and/or other groupings of the CTR information for the information item.

Figure 3:
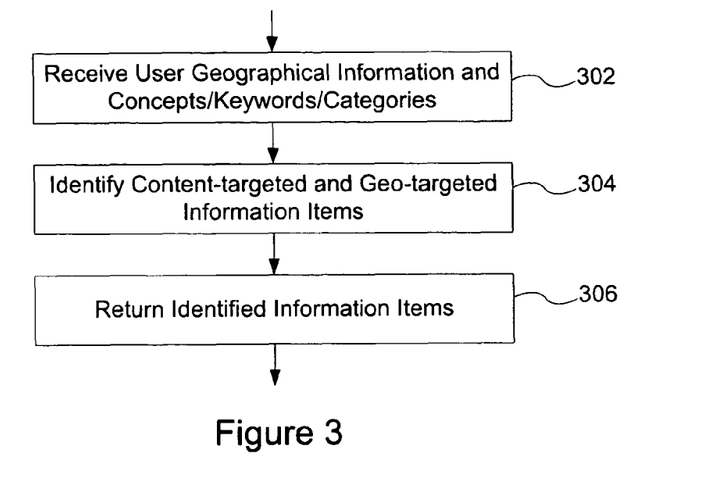
FIG. 3 is a flow diagram of a process for identifying geo-targeted, content-targeted information by an information server in accordance with some embodiments of the present invention.

FIG. 3 illustrates an exemplary process of identifying geo-targeted, content-targeted information in accordance with some embodiments of the present invention. The process may be performed by an information server, such as an advertisement server. The process receives a request for one or more information items. The request includes user geographical information and message content information in the form of concepts, keywords, or categories (302). Based on the information in the request, the process identifies a set of content-targeted, geo-targeted information items (304). In some embodiments, operation 304 may be a multi-step process. For example, the process may initially identify a set of information items that match, or that are consistent with the geographical information and content information in the request. Each of the identified information items may be assigned one or more scores that are then used to rank the identified matching information items. A score for each identified information item may be computed based on a plurality of factors that indicate how well each of the identified information items matches the geographical information and content information in the request. Once the identified information items have been ranked, the process selects one or more of the information items based on their ranks. The number of selected information items may be determined, for example, by a parameter in the request and by the number of identified matching information items, if any. The selected information items are then returned to the requesting information service or user (306).

In some embodiments, a subset of the top ranked information items identified by the process are randomly or pseudo-randomly selected for display to the requesting user. For instance, N of the top M ranked information items may be selected using a pseudo-random selection process. As a result, the set of information items presented to the user will vary over time, thereby increasing the likelihood that one or more items of interest to the user will be presented to the user.

As noted earlier, a subset of the information items (such as advertisements) may be targeted at users located in specific geographic regions. Some information items may even be targeted specifically at users currently located a specified geographic region whose default geographic location is elsewhere. In other words, some information items may be targeted at users visiting a specified geographic region. Such information items may include advertisements and other information deemed to be most useful to, or deemed to be most likely to be of interest to visitors (e.g., information about hotels and other services for visitors). The process of identifying a set of information items that match, or that are consistent with the geographical information and content information in the request may include one or more of the following:

(a) identifying information items that are not geo-targeted, but which match the content information in the request;

(b) identifying geo-targeted information items that match both the user's current location and the content information in the request;

(c) identifying "strongly geo-targeted information items" that match the user's current location, without requiring any match to the content information in the request (i.e., these may include information items with do not have any associated keywords, concepts or categories);

(d) identifying geo-targeted information items that match the user's current location, but only when the user's default location is outside the geo-targeted region; and (e) identifying geo-targeted information items that match the user's current location, but only when the user's default location is different from the user's current location;

In some embodiments, two or more of the above identified methods are used to identify information items. As noted above, the identified items are assigned on or more scores, ranked, and a subset is selected based on the rankings and then returned to the requester.

One skilled in the art will understand that the role of user geographical information in identifying targeted information may vary depending on different implementation schemes. In some other instances, the user geographical information may play a more significant role than the content information in identifying targeted information. For example, when a user travels to a city or country different from his default location and logs into his or her account, the process may favor information items useful to first-time visitors, e.g., lodging, weather, etc. For instance, when the user is determined to be at a different geographical location than his default geographical location, a scoring function (used to compute a score for each identified information item) may be used that gives greater weight to geographical scoring factors (based on the user's current geographical location) than the scoring function used when the user's current geographical location is the same as his default geographical location. The scoring function may also take into account the number of times the user has logged into his account from the non-default location, or the amount of time the user has been at the non-default location (as represented by, for example, by the amount of time since the user's first login at the non-default location). For instance, the process may use an intermediate level of weighting for geographical scoring factors when the number of login events at the non-default location exceeds a predefined threshold value (e.g., 1, 2, 3 or 10), or when the amount of time the user has been at the non-default location exceeds a predefined value (e.g., one or two days). In some embodiments, the weight assigned to geographical scoring factors by information item selection process may be gradually changed from a highest predefined value to a lowest predefined value in accordance with the number of user logins at the non-default location, or in accordance with the amount of time the user has been at the non-default location.

Figure 4:
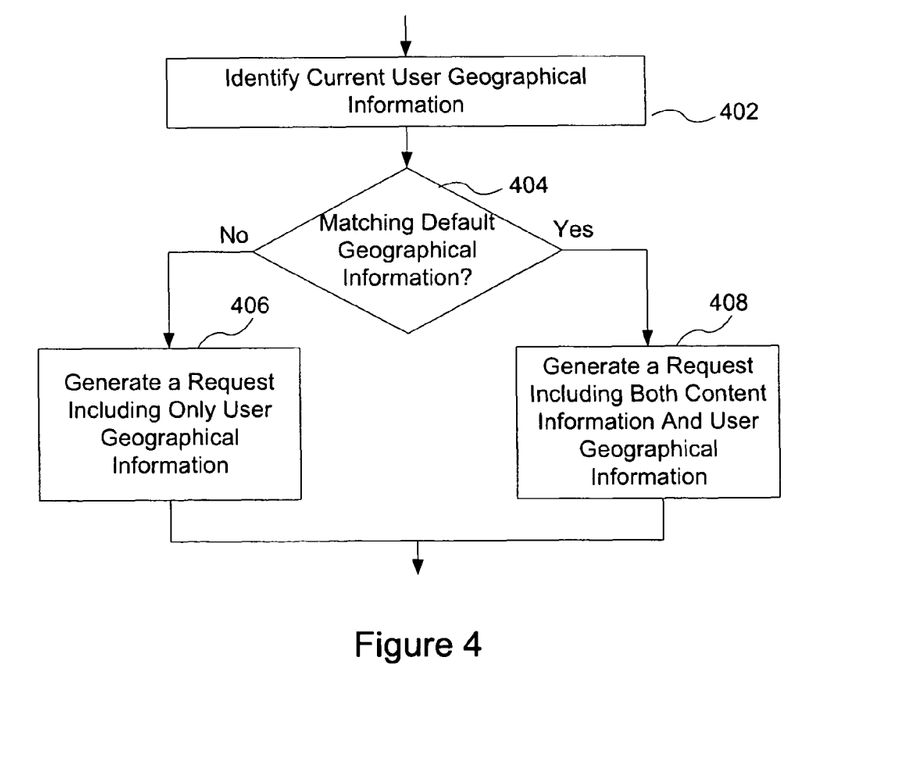
FIG. 4 is a flow diagram of a process for generating different types of information requests based on user geographical information in accordance with some embodiments of the present invention.

FIG. 4 depicts an exemplary process of generating different types of information requests based on the user's current geographical information in accordance with some embodiments of the present invention. When the user logs into his or her account, the information service 106 identifies the user's current geographical information (402). The information service 106 compares the current geographical information with the user's default geographical information (404). The user's default geographical information may be provided by the user when he or she opens the account, or may be determined dynamically by the information service 106 using statistical information, e.g., how many times the user has logged in from a particular geographical location or IP address over the month or year. If the current geographical information matches the default geographical information (404, Yes), such as when the user logs into his account from home or home office, the process generates or receives an information request including both the user's current geographical information and the content information associated with the requested message (408). Otherwise (404, No), the process generates or receives a request that includes the user's current geographical information, but not the content information associated with the requested message.

When the request does not include content-related information, the user may find that a displayed conversation is accompanied by a set of information items that are not associated with the content of the conversation. For example, there may be links to tourist attractions and restaurants in the city the user is currently visiting. There may be links or phone numbers to rental car offices in the city. The information items may include a weather report or weather forecast associated with the user's current location. Although these information items may have no association with the retrieved conversation or messages, these information items may be of greater interest to the user than information items related to the content of the conversation or messages.

As noted above, the information item retrieval process may return some information related only to the user's current geographical information, some that are only related to the message content, and some that are related to both types of information.

Figure 5:
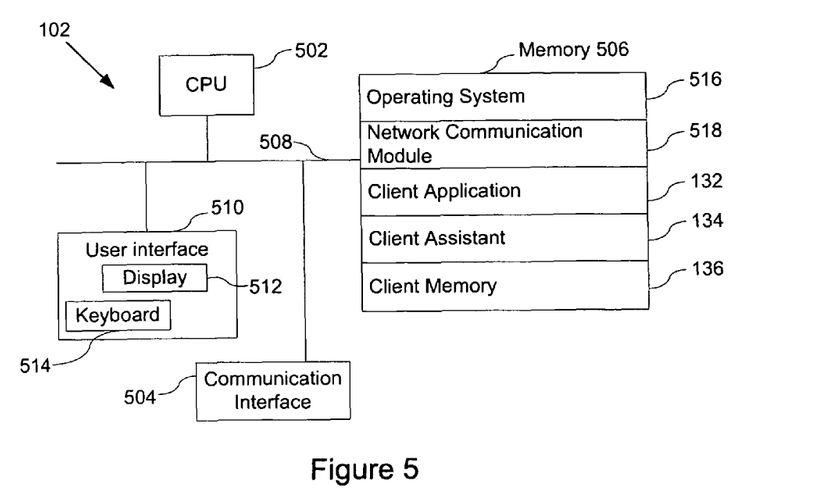
FIG. 5 is a block diagram of an exemplary client in accordance with some embodiments of the present invention.

FIG. 5 is a block diagram illustrating a client 102 in accordance with one embodiment of the present invention. The client 102 typically includes one or more processing units (CPUs) 902, one or more network or other communications interfaces 504, memory 506, and one or more communication buses 508 for interconnecting these components. The client 102 optionally may include a user interface 510 comprising a display device 512 and a keyboard 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, memory 506 stores the following programs, modules and data structures, or a subset thereof:

an operating system 516 that includes procedures for handling various basic system services and for performing hardware dependent tasks;

a network communication module 518 that is used for connecting the client 102 to other computers via the one or more communication network interfaces 504 and one or more communication networks, such as the Internet, other wide area networks, local area networks, metropolitan area networks, and so on;

a client application 132 that can permit a user to interact with the client 102 as described above;

a client assistant 134 that can perform one or more tasks as described above; and a client memory 136 that can optionally include data structures hosting content elements and content element filters, examples of which are described above.

Figure 6:
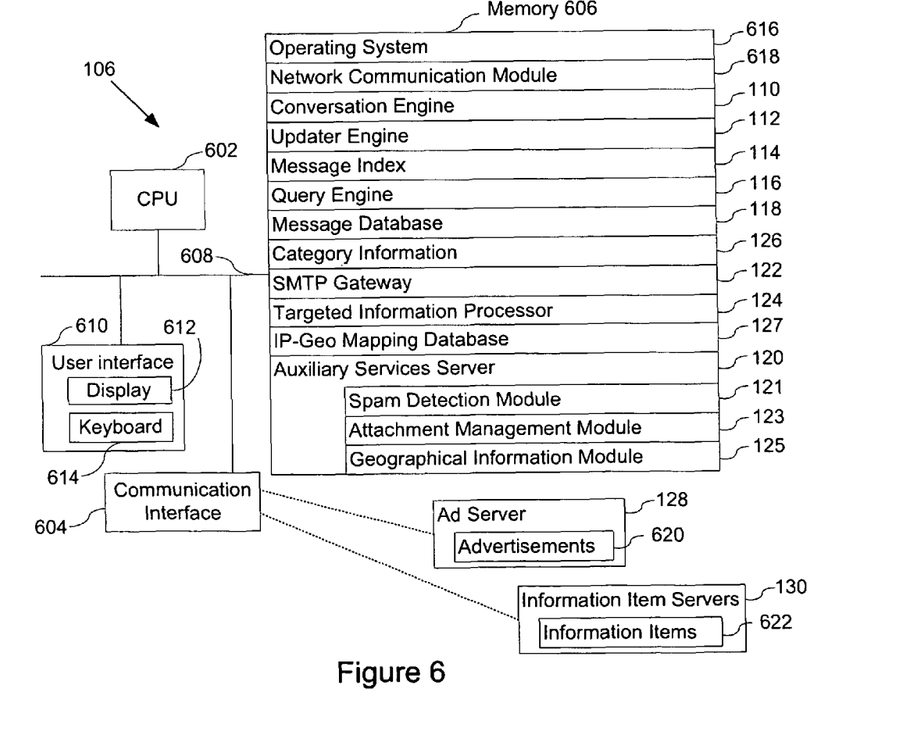
FIG. 6 is a block diagram of an exemplary information server in accordance with some embodiments of the present invention.

FIG. 6 is a block diagram illustrating an information service 106 in accordance with one embodiment of the present invention. The information service 106 typically includes one or more processing units (CPUs) 602, one or more network or other communications interfaces 604, memory 606, and one or more communication buses 608 for interconnecting these components. The information service 106 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

an operating system 616 that includes procedures for handling various basic system services and for performing hardware dependent tasks;

a network communication module 618 that is used for connecting the information service 106 to other computers via the one or more communication network interfaces 604 and one or more communication networks, such as the Internet, other wide area networks, local area networks, metropolitan area networks, and so on;

a targeted information processor 124 for obtaining targeted information for one or more identified messages as described above; and category information 126 that can include data structures hosting content elements and content element filters, examples of which are described above.

In some embodiments, the information service 106 includes the following elements, or a subset or superset of such elements: a conversation engine 110 for responding to a variety of requests from the client assistant 134 returning conversation-based responses; an updater engine 112 for updating a message database 118; a message index 114 containing index information for messages in the message database 118; a query engine 116 for performing various queries using the message index 114 and message database 118; an SMTP gateway 122 for sending and receiving messages; an auxiliary services server 120 for performing various auxiliary services; and an IP-Geo mapping database 127 for generating user geographical information from the user's current IP address.

Illustratively, the auxiliary services server 120 may include a spam detection module 121 for detecting and processing spam, an attachment management module 123 for managing the storage and retrieval of documents attached to messages, and a geographical information module 125 for extracting user geographical information from a login or message access request with the help of the IP-Geo mapping database 127.

The information service 106 can be connected to advertisement server 128 and/or information item server 130 via the communication interface 604. Advertisement server 128 can contain one or more advertisements 620. The advertisement server 128 can receive input and return advertisements that can be relevant to the input. The information item server 130 can include one or more information items 622. Similar to the advertisement server 128, the information server 130 can receive input and return informational items that can be relevant to the input.

Each of the above identified elements in FIGS. 5 and 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 or 606 may store a subset of the modules and data structures identified above. Furthermore, memory 506 or 606 may store additional modules and data structures not described above.

Although FIGS. 5 and 6 show respectively a client 102 and an information service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement an information service 106 and how features are allocated among them will vary from one implementation to another, and may depend in part on the amount of data traffic that the system must handle during peak usage periods as well as during average usage periods. For example, the service of converting an IP address into user geographical information can be delegated to a third-party server to which the information service 106 has a connection through the communication with the communication interface 604.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of serving information items to a user in connection with an electronic message performed on a server system having one or more processors and memory storing one or more programs for execution by the one or more processors, comprising:
    responding to a request from a client for an electronic message, including:
        identifying user geographical information obtained from the request from the client for an electronic message;
        identifying a first set of information items based at least in part on the user geographical information;
        identifying one or more electronic messages in response to the client request;
        determining whether the user geographical information matches default geographical information associated with the user;
        wherein at least one of the first set of information items is identified in accordance with the user geographical information, without regard to content of the one or more electronic messages, when the user geographical information has been determined to not match default geographical information associated with the user; and
        wherein at least one of the first set of information items is identified in accordance with both the user geographical information and content of the electronic message, when the user geographical information has been determined to match the default geographical information associated with the user; and
        sending the electronic message and the first set of information items to the requesting client for concurrent display of the electronic message and at least a subset of the first set of information items at the client.

2. The method of claim 1, wherein the user geographical information is an IP address of the client.

3. The method of claim 1, wherein at least one of the first set of information items was selected in accordance with both the user geographical information and content of the electronic message.

4. The method of claim 1, wherein at least one of the first set of information items is an advertisement targeting users at a location corresponding to the user geographical information.

5. The method of claim 1, wherein at least one of the first set of information items is an information item uniquely associated with a location corresponding to the user geographical information.

6. The method of claim 1, wherein the electronic message is a message selected from the group consisting of an email message, IM message, SMS message, transcribed voice message, and any combination thereof.

7. A method of displaying information items to a user in connection with an electronic message performed on a client system having one or more processors and memory storing one or more programs for execution by the one or more processors, comprising:
    transmitting user geographical information with a request transmitted by the client for an electronic message;
    receiving the electronic message and a first set of information items selected at least in part in accordance with the user geographical information;
    wherein at least one of the first set of information items is identified in accordance with the user geographical information, without regard to content of the electronic message, when the user geographical information does not match default geographical information associated with the user; and
    wherein at least one of the first set of information items is identified in accordance with both the user geographical information and content of the electronic message, when the user geographical information does match the default geographical information associated with the user; and
    concurrently displaying the electronic message and at least a subset of the first set of information items.

8. A system for serving information items to a user in connection with an electronic message, comprising:
    memory;
    one or more processors; and
    at least one program, stored in the memory for execution by the one or more processors, the at least one program including instructions for:
        responding to a request from a client for an electronic message, including:
            identifying user geographical information obtained from the request from the client for an electronic message;
            identifying a first set of information items based at least in part on the user geographical information;
            identifying one or more electronic messages in response to the client request;
            determining whether the user geographical information matches default geographical information associated with the user;
            identifying at least one of the first set of information items in accordance with the user geographical information, without regard to content of the one or more electronic messages, when the user geographical information has been determined to not match default geographical information associated with the user;
            identifying at least one of the first set of information in accordance with both the user geographical information and content of the electronic message, when the user geographical information has been determined to match the default geographical information associated with the user; and
            sending the electronic message and the first set of information items to the requesting client for concurrent display of the electronic message and at least a subset of the first set of information items at the client.

9. The system of claim 8, wherein the user geographical information is an IP address of the client.

10. The system of claim 8, the at least one program further comprising instructions to select at least one of the first set of information items in accordance with both the user geographical information and content of the electronic message.

11. The system of claim 8, wherein at least one of the first set of information items is an advertisement targeting users at a location corresponding to the user geographical information.

12. The system of claim 8, wherein at least one of the first set of information items is an information item uniquely associated with a location corresponding to the user geographical information.

13. The system of claim 8, wherein the electronic message is a message selected from the group consisting of an email message, IM message, SMS message, transcribed voice message, and any combination thereof.

14. A system for displaying information items to a user in connection with an electronic message, comprising:
- memory;
- one or more processors; and
- at least one program, stored in the memory for execution by the one or more processors, the at least one program including instructions for:
  - transmitting user geographical information with a request transmitted by the client for an electronic message;
  - receiving the electronic message and a first set of information items selected at least in part in accordance with the user geographical information;
  - wherein at least one of the first set of information items is identified in accordance with the user geographical information, without regard to content of the electronic message, when the user geographical information does not match default geographical information associated with the user; and
  - wherein at least one of the first set of information items is identified in accordance with both the user geographical information and content of the electronic message, when the user geographical information does match the default geographical information associated with the user; and
  - concurrently displaying the electronic message and at least a subset of the first set of information items.

15. A non-transitory computer readable storage medium storing one or more programs configured for execution by a server system, the one or more programs comprising instructions for:
- responding to a request from a client for an electronic message, including:
  - identifying user geographical information obtained from the request from the client for an electronic message;
  - identifying a first set of information items based at least in part on the user geographical information;
  - identifying one or more electronic messages in response to the client request;
  - determining whether the user geographical information matches default geographical information associated with the user;
  - identifying at least one of the first set of information items in accordance with the user geographical information, without regard to content of the one or more electronic messages, when the user geographical information has been determined to not match default geographical information associated with the user;
  - identifying at least one of the first set of information in accordance with both the user geographical information and content of the electronic message, when the user geographical information has been determined to match the default geographical information associated with the user; and
- sending the electronic message and the first set of information items to the requesting client for concurrent display of the electronic message and at least a subset of the first set of information items at the client.

16. The computer readable storage medium of claim 15, wherein the user geographical information is an IP address of the client.

17. The computer readable storage medium of claim 15, the one or more programs further comprising instructions to select at least one of the first set of information items in accordance with both the user geographical information and content of the electronic message.

18. The computer readable storage medium of claim 15, wherein at least one of the first set of information items is an advertisement targeting users at a location corresponding to the user geographical information.

19. The computer readable storage medium of claim 15, wherein at least one of the first set of information items is an information item uniquely associated with a location corresponding to the user geographical information.

20. The computer readable storage medium of claim 15, wherein the electronic message is a message selected from the group consisting of an email message, IM message, SMS message, transcribed voice message, and any combination thereof.

21. A non-transitory computer readable storage medium storing one or more programs configured for execution by a client system, the one or more programs comprising instructions for:
- transmitting user geographical information with a request transmitted by the client for an electronic message;
- receiving the electronic message and a first set of information items selected at least in part in accordance with the user geographical information;
- wherein at least one of the first set of information items is identified in accordance with the user geographical information, without regard to content of the electronic message, when the user geographical information does not match default geographical information associated with the user; and
- wherein at least one of the first set of information items is identified in accordance with both the user geographical information and content of the electronic message, when the user geographical information does match the default geographical information associated with the user; and
- concurrently displaying the electronic message and at least a subset of the first set of information items.

* * * * *